United States Patent [19]

Habbab et al.

[11] Patent Number: 4,797,879
[45] Date of Patent: Jan. 10, 1989

[54] PACKET SWITCHED INTERCONNECTION PROTOCOLS FOR A STAR CONFIGURED OPTICAL LAN

[75] Inventors: Isam M. I. Habbab, Aberdeen; Mohsen Kavehrad, Holmdel; Carl-Erik Sundberg, Hazlet, all of N.J.

[73] Assignee: American Telephone and Telegraph Company AT&T Bell Laboratories, Murray Hill, N.J.

[21] Appl. No.: 58,739

[22] Filed: Jun. 5, 1987

[51] Int. Cl.$^4$ ............................................... H04B 9/00
[52] U.S. Cl. ........................................ 370/3; 370/89; 370/94; 455/607; 455/612; 455/617
[58] Field of Search ................... 370/85, 94, 89, 124, 370/3, 93, 104; 455/606, 607, 612, 617, 618, 619

[56] References Cited

U.S. PATENT DOCUMENTS

| | | | |
|---|---|---|---|
| 3,499,995 | 3/1970 | Clark et al. | 370/93 |
| 4,584,678 | 4/1986 | Ozeki et al. | 370/85 |
| 4,712,859 | 12/1987 | Abanese et al. | 370/3 |

OTHER PUBLICATIONS

Abramson, Proc. Fall Joint Computer Conf., 1970, AFIPS Press, vol. 37, pp. 281–285.
Roberts, Computer Comm. Rev., vol. 5, Apr. 1975, pp. 28–42.
Kleinrock et al., IEEE Trans. Comm., vol. COM-23, No. 12, Dec. 1975, pp. 1400–1416.
Szpankowski, Computer Networks, vol. 7, No. 1, Feb., 1983, pp. 17–26.
Marsan et al., IEEE Jrnl. Sel. Areas. Comm., vol. SAC-1, No. 5, Nov. 1983, pp. 885–897.
Hooper et al., Jrnl. Lightwave Tech., vol. LT-1, No. 4, Dec. 1983, pp. 596–611.
Okoshi, Jrnl. Lightwave Tech., vol. LT-1, No. 4, Aug. 1984, pp. 341–345.
Takagi et al., IEEE Trans. Comm., vol. COM-33, No. 11, Nov. 1985, pp. 1191–1199.
Takagi et al., IEEE Trans. Comm., vol. COM-33, No. 11, Nov. 1985, pp. 1200–1207.
Sousa et al., Globecom '84, vol. I, Nov. 1984, Atlanta, Ga., pp. 15.3.1–15.3.6.

Primary Examiner—Robert L. Griffin
Assistant Examiner—Leslie Van Beek
Attorney, Agent, or Firm—Erwin W. Pfeifle

[57] ABSTRACT

The present invention relates to packet switched interconnection protocols for use in high-speed optical Star-configured Local Area Networks (LANs). In the present Star LAN, a plurality of N+1 wavelength division multiplexed (WDM) channels are provided for use by M transceivers connected to the Star coupler, where preferably M>N. N of the N+1 WDM channels are used for transmission of data packets, and the remaining WDM channel is used by all transceivers for transmitting control packets only. In the present protocols, a transmitter in an active transceiver first send a control packet over the control channel using a first protocol such as, for example, ALOHA or CSMA. The control packet includes (1) the transmitter's unique address, (2) the destined receiver's address, and (3) the address of the data channel to be used in transmitting the associated data packet. Immediately after the control packet is sent, the associated data packet is transmitted over the chosen one of the N data channels using a second protocol such as, for example, ALOHA, CSMA or N-Server Switch. In the Star network, the transceivers receive their own transmissions and detect if a collision or not has occurred, and if a collision is detected the transmission procedure is repeated until successful.

12 Claims, 4 Drawing Sheets

PACKET SWITCHED INTERCONNECTION PROTOCOLS FOR A STAR CONFIGURED OPTICAL LAN

TECHNICAL FIELD

The present invention relates to protocols for very high speed optical fiber Local Area Networks (LANs) using a passive Star topology.

DESCRIPTION OF THE PRIOR ART

Coherent optical receivers as described, for example, in the article by R. C. Hooper et al. in *Journal of Lightwave Technology*, Vol. LT-1, No. 4, December, 1983 at pages 596–611; and in the article by T. Okoshi in *Journal of Lightwave Technology*, Vol. LT-2, No. 4, August, 1984 at pages 341–345 offer the possibility of utilizing the large bandwidth of single-mode fibers in Local Area Networks (LANs). An obstacle to realizing high-speed transmission of optical signals is the bottleneck at the interface to electronics due to the present slow processing response of logic. Wavelength division multiplexing (WDM), by providing a multichannel system with a set of parallel channels at a low data rate compared to the aggregate rate, can alleviate the interfacing problem. A multichannel LAN (M-LAN) offers the reliability characteristics that are typical of a bus structured LAN, as opposed to a ring, while providing a large bandwidth compatible with high-speed optical transmission.

Today's lasers suffer from line broadening due to phase noise and can be tuned with difficulty over a limited frequency range. In multi-user M-LANs it is desirable to have the number of users much greater than the number of available wavelengths and, therefore, some form of contention sharing and packet switching may be necessary. The M-Lan can be realized in a distributed form using a bus topology or in centralized form using a Star topology. A passive Star-coupler can be used as a broadcast medium to cross-connect users of a LAN. Recent studies of the performance of multi-channel packet switched systems have included multichannel carrier sense multiple access (CSMA) and CSMA with collision detection (CSMA/CD) as described, for example, in the article by M. A. Marsan et al. in *IEEE Journal on Selected Areas on Communication*, Vol. SAC-1, No. 5, November, 1983 at pages 885–897; and multichannel radio slotted ALOHA systems as described, for example, in the article by W. Szpankowski in *Computer Networks*, Vol. 7, No. 1, February, 1983 at pages 17–26. In the latter reference, data packets are sent by the transmitters using one of V subchannels of the multi-access up-link radio channel, where the transmitters have random access to the subchannels. Packets may interfere or not and users are informed of such interference via a feedback channel, and if an interference has occurred, the packet is retransmitted after a random time delay.

The problem remaining in the prior art is to provide a LAN which can achieve capacity of 100 Gbit/sec with user rates of up to 1 Gbit/sec which is reasonably simple and inexpensive to implement.

SUMMARY OF THE INVENTION

The foregoing problem in the prior art has been solved in accordance with the present invention which relates to an optical fiber Local Area Network (LAN) using a passive Star topology and protocols which permit such topology to achieve very high speed. More particularly, in the present high-speed LAN, a plurality of N wavelength division multiplex (WDM) data channels are used for data packet transmissions, and an additional WDM channel is used solely by all transmitters and receiver to transmit and receive, respectively, control packets. To transmit a data packet, a transmitter of an active transceiver first chooses one of the N WDM data packet channels, which choice may be on a random basis, and then transmits a control packet on the control channel, including the transmitter's and destined receiver's identification plus the chosen data channel number, and immediately thereafter transmits the data packet on the chosen WDM data channel. The idle receivers monitor the control channel, and upon receiving a control packet that has not collided with another control packet transmission from another transmitter, and indicating that idle receiver as the destination of the following data packet, immediately switches to the indicated WDM data channel to receive the data packet. With the Star network topology, a transmitting transceiver monitors its transmissions to see if it receives such transmissions after passing through the Star network without a collision. If a collision is detected with a transceiver packet, that transceiver retransmits the control and data packets using the same or a different WDM data channel until no collision is detected.

It is an aspect of the present invention to provide a high-speed lightwave LAN using either one of three protocols. A first protocol is termed ALOHA/ALOHA, where the first term designates the protocol used with the control channel, and the second term designates the protocol used with the chosen WDM data channels. With the ALOHA/ALOHA protocol, the control and data packets are sent at random over the control and randomly chosen WDM data channel without acknowledgement between the packets. A second protocol is a variation on the ALOHA/ALOHA protocol and termed ALOHA/CSMA (Carrier Sense Multiple Access) wherein an idle WDM data channel is sensed before the control packet on the control channel is transmitted while concurrently jamming the sensed idle WDM data channel, and immediately thereafter transmitting the data packet on the sensed idle WDM data channel. A third protocol can be called CSMA/N-Server Switch, where all idle transceivers normally monitor the control channel to use the control packets to maintain a list of the idle receivers and WDM data channels. When a transceiver becomes active it sends its control packet, when the control channel is found idle, immediately followed by a data packet on an idle chosen WDM data channel.

Other and further aspects of the present invention will become apparent during the course of the following description and by reference to the accompanying drawings.

DETAILED DESCRIPTION

Figure 1:
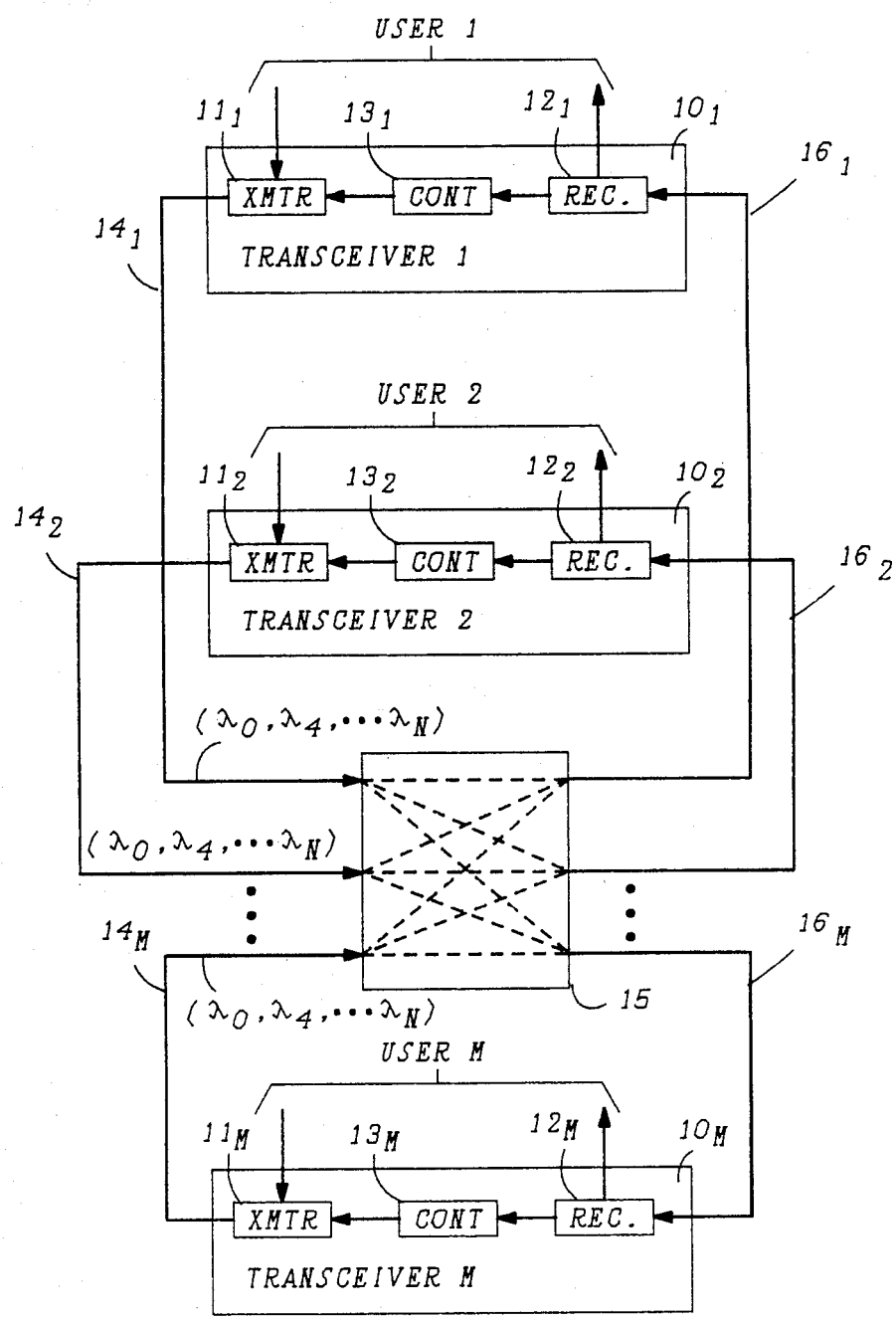
FIG. 1 is a block diagram of a Star-configured Multichannel Optical Local Area Network.

FIG. 1 is a block diagram of a Star-configured network for practicing the access protocols of the present invention. As shown in FIG. 1, the enormous bandwidth of a single-mode optical fiber Star Local Area Network (LAN) is divided into N+1 channels with each channel using a different wavelength, as found in a multichannel LAN. In the present system arrangement, one channel operating at a wavelength $\lambda_0$ is used for control packet traffic and the other N wavelength division multiplexed (WDM) channels, operating at wavelengths $\lambda_1, \lambda_2, \ldots, \lambda_N$, are assigned to actual data traffic. In the exemplary Star optical network of FIG. 1, there are shown M users of the LAN, and each of users 1-M is associated with a separate one of transceiver $10_1$ to $10_M$, respectively. Each of transceivers $10_1$ to $10_M$ can transmit or receive via any of the N data channels as well as the control channel by proper use of their tunable laser(s), or other equivalent lightwave source(s). The optical transmissions from each of transmitters $11_1$ to $11_M$ propagates over optical waveguides $14_1$ to $14_M$, respectively, to a Star coupler 15 where the transmissions from all transmitter $11_i$ are distributed to all M output optical waveguides $16_1$ to $16_M$ which terminate in receivers $12_1$ to $12_M$, respectively, in respective transceivers $10_1$ to $10_M$.

With the Star configuration of FIG. 1, each receiver $12_i$ needs to be informed of what data channel $\lambda_1$ to $\lambda_N$ to listen to for reception of its data packet and possibly the identity of the transmitting user. In accordance with the present invention a control channel $\lambda_0$ is shared by all transceivers $10_1$ to $10_M$ on a contention basis. Additionally, with multi-user M-LANs, it is desirable to have the number of users much greater than the number of available data channels, and, therefore, some form of contention sharing and packet switching may be necessary. A control circuit $13_i$ is provided in each of transceivers $10_i$ to provide contention and/or collision detection and control packet information as will be better understood in subsequent discussions of the various protocols of the present invention to provide a high speed LAN.

Figure 2:
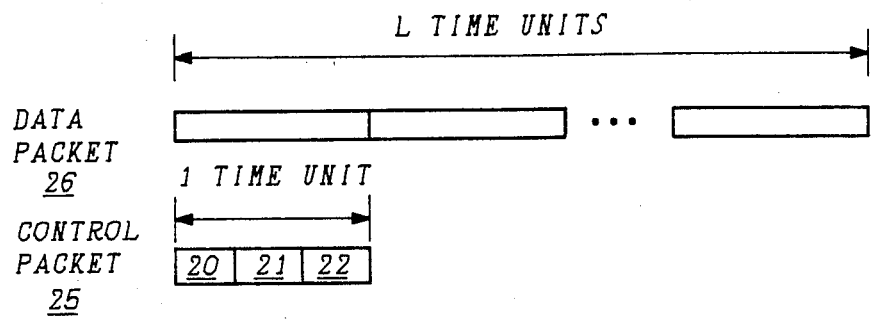
FIG. 2 is a block diagram of an exemplary format of both a data packet and a control packet for use in the network of FIG. 1 in accordance with the present invention.

In the subsequent protocols to be used, as shown in FIG. 2, a transmitter $11_i$ first sends a control packet 25 on the control channel $\lambda_0$, the control packet consisting of the transmitter's unique address bits 20, the destined receiver's unique address bits 21, and the data channel 22 to be used for the data packet transmission. As also shown in FIG. 2, the length of the control packet 25 is typically much smaller than the actual length of data packet 26, which will hereinafter be assumed to be L time units longer than the control packet length. In the receiving mode, an idle user's receiver $12_i$ is tuned to the control channel $\lambda_0$ wavelength to listen for its address. Upon recognizing its address, the receiver will tune to the data channel indicated in the control packet 25 which is actually used for the data packet 26 transmission. If it is assumed that the aggregate traffic offered by the M users to the control channel is G, then having a uniform traffic distribution implies that the offered traffic to each of the N data channels is on average GL/N.

The users of the system exercise a contention method to send their control packets 25 and their data packets 26. By a receiver $12_i$ recognizing its address in control packet 25 and then accessing the indicated data channel 26, proper interconnection of users is ensured. However, a type of access method has not yet been specified. Acknowledgements of success or failure of the combined control 25 and data 26 packets can be obtained by each transceiver $10_i$ by listening to the echo of that transceiver's transmitted packets 25 and 26, since the Star coupler 15 is a broadcast medium. Thus a decision to retransmit the control and data packet is determined locally in, for example, a control circuit $13_i$ in each associated transceiver $10_i$ which can be accomplished, for example, by comparing the transmitted packets with the received packets.

Figure 3:
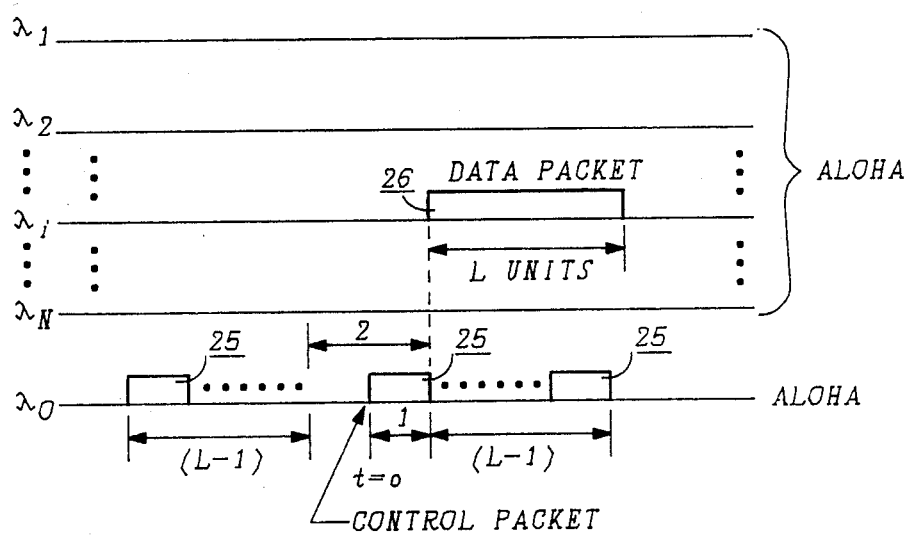
FIG. 3 is a diagram of an unslotted ALOHA/ALOHA access protocol for use in the network of FIG. 1 in accordance with the present invention.
Figure 4:
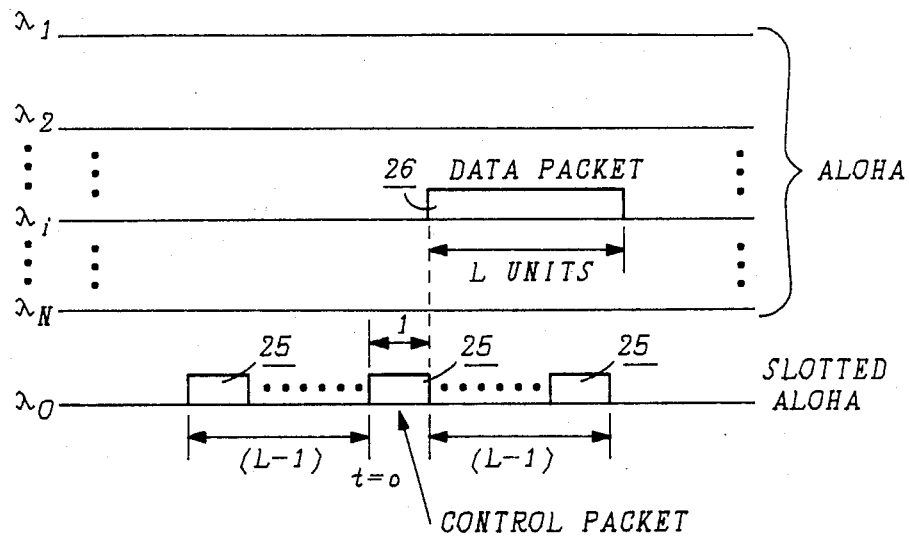
FIG. 4 is a diagram of a slotted ALOHA/ALOHA access protocol for use in the network of FIG. 1 in accordance with the present invention.

To transmit the control packet 25 and the data packet 26 over the control channel $\lambda_0$ and one of the N data packet channels $\lambda_i$, respectively, a first protocol that can be used in accordance with the present invention will be termed ALOHA/ALOHA, where the first part of the term designates the protocol used on the control channel and the second part of the term designates the protocol used on the chosen data channel. In the ALOHA/ALOHA protocol, each user transmits a control packet 25 of the control channel $\lambda_0$ at random, and immediately thereafter transmits a data packet 26 over one of the N data channels $\lambda_i$, also at random. The ALOHA/ALOHA protocol can be practiced using either of one of the unslotted ALOHA/ALOHA protocol, as shown in FIG. 3, or the slotted ALOHA/ALOHA protocol, as shown in FIG. 4. With such protocol, each transceiver ideally requires only one tunable laser, or other equivalent lightwave source, for randomly transmitting the control packet 25, using the control channel frequency $\lambda_0$, and then the data packet 26 using a randomly chosen one of the N data packet channel frequencies $\lambda_1$ to $\lambda_N$.

The single channel unslotted ALOHA protocol is well known as discussed, for example, in the article, in the article by N. Abramson in the *Proceedings of the Fall Joint Computer Conference*, 1970, AFIPS Press, Vol. 37, pages 281-285, which is the simplest of random access techniques and assumes transmission at random with no regard for other users of the system. In the unslotted ALOHA/ALOHA protocol of FIG. 3, each transmitter $11_i$ transmits the control packet 25 at random with no regard for other control packet 25 transmissions, and immediately thereafter transmits the associated data packet 26 in a randomly chosen data packet channel without regard to other data packet 26 transmissions that may also use that same data packet channel, In the slotted ALOHA/ALOHA protocol shown in FIG. 4, the transceivers $10_i$ start transmitting over the control channel at the beginning of a pre-assigned channel time slot. With such protocol, the control packet 25 lasts for one time slot while each data packet 26 lasts for L successive time slots following the control packet slot.

Figure 5:
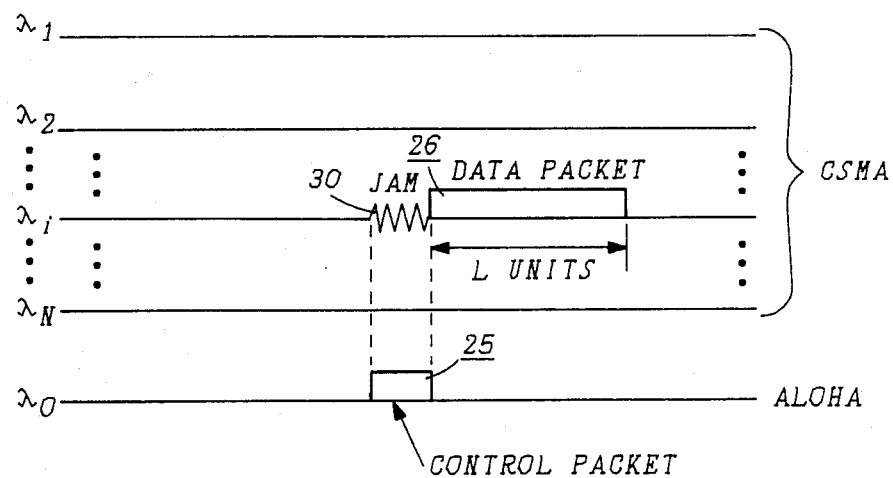
FIG. 5 is a diagram of an unslotted or slotted ALOHA/CSMA access protocol for use in the network of FIG. 1 in accordance with the present invention.

A variation of the ALOHA/ALOHA protocol is the ALOHA/CSMA protocol shown in FIG. 5. The single-channel Carrier Sense Multiple Access (CSMA) protocol was first analyzed in an article by L. Kleinrock et al. in *IEEE Transactions on Communications*, Vol. COM-23, No. 12, December, 1975 at pages 1400-1416, which assumes that the transceivers sense the channel before they transmit, and once the channel is sensed as being busy the transceivers stop transmitting. In the ALOHA/CSMA protocol, a transceiver $10_i$ uses the known Carrier Sense Multiple Access (CSMA) technique to sense data channels 1-N one at a time to find an idle one. Upon obtaining an idle data channel, the transceiver $10_i$ transmits a blocking or jamming signal 30 on the idle data channel for the time period of one control packet and simultaneously sends a control packet 25 on the control channel using an unslotted or a slotted ALOHA technique, and immediately thereafter starts the actual data packet 26 transmission on the data channel that was found idle and blocked or jammed. Because both the blocking or jamming of the data channel and the control packet 25 transmission needs to be performed at the same time, the ALOHA/CSMA protocol would normally require having two lasers, or other equivalent lightwave sources, at every transceiver 10. It is to be understood, however, that this protocol can be modified slightly, at the expense of increased delay, to enable only one laser or other equivalent lightwave source to be used as follows. A blocking or jamming signal is used to ensure that the data channel is reserved while the control packet 25 is sent. Each transceiver $10_i$ listens to the data channel for a time period longer than a control packet 15 to establish that the data channel is free. Then th transceiver $10_i$ blocks or jams the channel for an equivalent period and sends the control information packet 25 by tuning its laser, or other equivalent lightwave source, to the wavelength of the control channel. The transceiver upon returning to the blocked data channel will find it free and reserved by virtue of this protocol.

Figure 6:
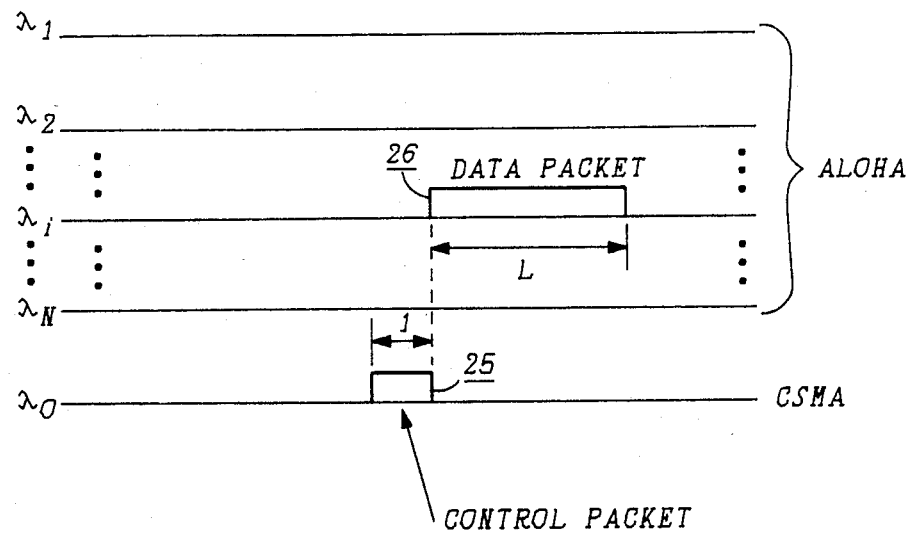
FIG. 6 is a diagram of a CSMA/ALOHA access protocol for use in the network of FIG. 1 in accordance with the present invention.

An alternative to the ALOHA/CSMA protocol of FIG. 5 is the CSMA/ALOHA protocol shown in FIG. 6. In the CSMA/ALOHA protocol, a transmitter $11_i$ first senses th control channel and once it is found idle, the transmitter transmits the control packet 25. Immediately thereafter, the transmitter transmits a data packet 26 on one of the data channels chosen at random. It is to be understood that the slotted or unslotted ALOHA protocol could be used for accessing of the data channel.

Figure 7:
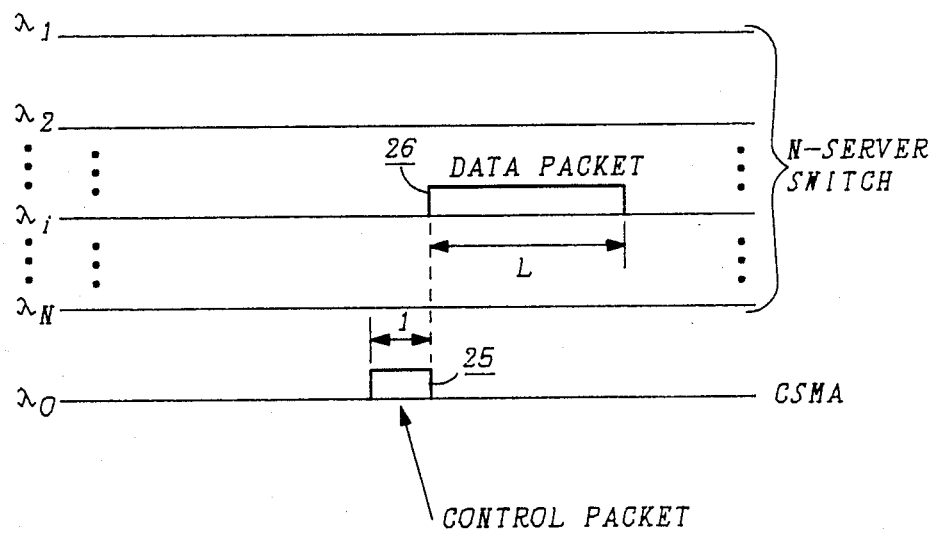
FIG. 7 is a diagram of a CSMA/N-Server Switch access protocol for use in the network of FIG. 1 in accordance with the present invention.

A final protocol in accordance with the present invention is designated hereinafter as the "CSMA/N-Server Switch" protocol which is shown in FIG. 7. For this protocol, it is assumed that all idle transceivers $10_i$, i.e., the ones that are not transmitting or receiving, monitor the control channel $\lambda_0$. By monitoring the control channel over the length of one data packet 26 of L time units, the transmitter $11_i$ will know exactly which data channels are idle and also which receivers $12_i$ are idle. Thus, if an intended receiver $12_j$ is ready to receive data, a control packet 25 is sent from transmitter $11_i$ to receiver $12_j$ via star coupler 15 with the information about the data channel wavelength $\lambda_k$ on which the data packet 26 will be sent. Before the control packet 25 is transmitted by transmitter $11_i$, its receiver $12_i$ senses the control channel until it is idle for transmitting the control packet. By using the CSMA/N-Server Switch protocol, no collision will occur on the data channels since an idle wavelength is used. When all the N data channels are found busy, the transmitter $11_i$, with a data packet 26 to be sent, stops transmission until one of the data channels (servers) becomes available and then proceeds to send the control packet 25, when the control channel is sensed as idle, followed immediately by the data packet 26 on the available data channel. The data channels in this protocol simply play the role of an N-server switch that can be blocked if all the servers are busy. For such protocol each transceiver only requires one laser, or other equivalent lightwave source, in each of the transmitters $11_i$.

What is claimed is:

1. A method of transmitting packets of information in an optical local area network (LAN) including a plurality of M optical transceivers connected to a Star coupler, the method comprising the steps of:

in transmitting information from a first transceiver to a second transceiver, (a) transmitting a control information packet at a random time period over a first wavelength division multiplex (WDM) channel using a first access protocol, the control information packet including information relating to (1) a unique identification of the first transceiver, (2) a unique identification of the second transceiver, and (3) an identification of a randomly chosen one of a plurality of N second WDM channels used to transmit data packets, where M>N; and (b) immediately after step (a), transmitting an associated data packet over the chosen one of the plurality of N second WDM channels indicated in the control information packet transmitted in step (a) using a second access protocol.

2. The method according to claim 1 wherein the method comprises the further steps of:

(c) receiving both the control information packet and the data packet transmitted in steps (a) and (b) from the Star coupler at the first and second transceivers and determining therefrom if either one of the control and/or data packets overlap the information concurrently transmitted by other transceivers on the same channels; and (d) causing (1) the first transceiver to reiterate steps (a) to (d) if an overlapping of transmissions from the first transceiver and another transceiver has occurred, and (2) the second transceiver to process the control and data packets when no overlapping of transmissions from the first transceiver and another transceiver has occurred.

3. The method according to claim 1 or 2 wherein the first access protocol and the second access protocol used in steps (a) and (b), respectively, are each an ALOHA protocol wherein the control packet and the data packet are each transmitted on the associated first and second WDM channel, respectively, at random without a regard for other transmissions in the LAN.

4. The method according to claim1 or 2 wherein the first access protocol used in step (a) is an ALOHA protocol wherein the control packet is transmitted on the first WDM channel at random without a regard for other control information packet transmissions in the LAN, and the second access protocol used in step (b) is a Carrier Sense Multiple Access (CSMA) protocol, and in performing step (a), performing the steps of (a1) using the CSMA protocol to find an idle one of the plurality of N second WDM channels normally transmitting data packets, and (a2) transmitting a blocking or jamming signal on the idle second WDM channel found in step (a1) while concurrently transmitting the control information packet on the first WDM channel.

5. The method according to claim 1 or 2 wherein
the first access protocol used in step (a) is a Carrier Sense Multiple Access (CSMA) protocol and the second access protocol used in step (b) is an ALOHA access protocol where one of the N second WDM channels is selected at random without regard for other data packet transmissions in the LAN, and in performing step (a) using the CSMA protocol to determine when the first WDM channel is idle before transmitting the control information packet on the first WDM channel.

6. The method according to claim 1 or 2 wherein
the first access protocol used in step (a) is a Carrier Sense Multiple Access (CSMA) protocol which is used to determine when the first WDM channel is idle before transmitting the control information packet; and
the second access protocol used in step (b) is an N/Server Switch protocol where each transceiver monitors the control information packets transmitted on the first WDM channel to update a list in a memory indicating (1) which of the N second WDM channels are idle and (2) which transceivers are idle, for choosing from said list an idle second WDM channel for transmitting the data packet in step (b).

7. A transceiver for use in transmitting packets of information to other transceivers in an optical Local Area Network (LAN) which includes a Star coupler, the transceiver comprising:
a receiver for receiving lightwave signals from the Star coupler and converting the lightwave signals into equivalent electrical output signals; and
a transmitter comprising means for (a) transmitting a control information packet a random time period over a first wavelength division multiplex (WDM) channel using a first access protocol, where the control information packet includes information relating to (1) a unique identification of the transceiver, (2) a unique identification of a second transceiver of the network with which the first transceiver desires to communicate, and (3) an identification of a randomly chosen one of a plurality of N second WDM channels used for transmitting data packets, and (b) transmitting an associated data packet over the chosen one of the plurality of second WDM channels, indicated in the control information packet, immediately after the transmission of the control information packet using a second access protocol.

8. A transceiver according to claim 7 wherein the transceiver further comprises
a controller for monitoring transmissions received from the Star coupler for determining if a control information packet and/or a data packet, that was transmitted by the transmitter, overlaps a random transmission from another transceiver of the network on the same first WDM channel or second one of the plurality of N second WDM channels, respectively, for causing the transmitter of said transceiver to retransmit the respective control information packet and the data packet using the same first and second access protocol, respectively.

9. A transceiver according to claim 7 or 8 wherein
the first access protocol and the second access protocol are each an ALOHA protocol where the control information packet and the data packet are each transmitted on the associated first and second WDM channel, respectively, randomly without a regard for other transmissions in the LAN.

10. A transceiver according to claim 7 or 8 wherein
the first access protocol is an ALOHA protocol where the control information packet is transmitted on the first WDM channel at random without a regard for other control information packet transmissions in the LAN, and
the second access protocol is a Carrier Sense Multiple Access (CSMA) protocol which is used to find an idle one of the plurality of N second WDM channels normally transmitting data packets before concurrently transmitting (a) a blocking or jamming signal on the idle one of the plurality of N second WDM channels to maintain that channel idle, and (b) the control information packet on the first WDM channel followed by the data packet on the idle second WDM channel.

11. A transceiver according to claim 7 or 8 wherein
the second access protocol is an ALOHA protocol where one of the second WDM channels is selected at random without regard fort other data packet transmissions in the LAN, and
the first access protocol is a Carrier Sense Multiple Access (CSMA) protocol which is used to sense when the first WDM channel is idle before transmitting the control information packet on the first WDM channel followed by the data packet on the randomly chosen second WDM channel.

12. A transceiver according to claim 7 wherein
the first access protocol is a Carrier Sense Multiple Access (CSMA) protocol which is used to sense when the first WDM channel is idle before transmitting the control information packet, and
the second access protocol is a N/Server Switch protocol where each transceiver monitors the control information packets transmitted on the first WDM channel to update a list in a memory indicating which transceivers in the LAN are idle and which of the plurality of N second WDM channels are idle for choosing from the list an idle data channel prior to transmitting the control information packet and then the data packet.

* * * * *